(12) United States Patent
Tatsuzue (10) Patent No.: US 9,342,030 B1
(45) Date of Patent: May 17, 2016

(54) POWER SUPPLY APPARATUS FOR SUPERIMPOSING DIRECT CURRENT VOLTAGE ON ALTERNATING CURRENT VOLTAGE AND OUTPUTTING RESULTING VOLTAGE

(71) Applicant: CANON KABUSHIKI KAISHA, Tokyo (JP)

(72) Inventor: Akira Tatsuzue, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/876,289

(22) Filed: Oct. 6, 2015

(30) Foreign Application Priority Data

Oct. 23, 2014 (JP) ................................. 2014-216629

(51) Int. Cl.
*G03G 15/00* (2006.01)
*H04B 3/54* (2006.01)

(52) U.S. Cl.
CPC ............... *G03G 15/80* (2013.01); *H04B 3/548* (2013.01)

(58) Field of Classification Search
USPC ................. 399/38, 53, 55, 75, 88; 363/21.09, 363/21.15
See application file for complete search history.

(56) References Cited

U.S. PATENT DOCUMENTS

| 5,412,455 A | 5/1995 | Ono et al. |
| 8,862,004 B2 * | 10/2014 | Maruyama ......... G03G 15/0194 399/100 |
| 2014/0293659 A1 * | 10/2014 | Kosaka ............. H02M 3/33546 363/21.09 |

FOREIGN PATENT DOCUMENTS

| JP | 2003-066697 A | 3/2003 |
| JP | 2004-037642 A | 2/2004 |
| JP | 2011-232450 A | 11/2011 |

* cited by examiner

*Primary Examiner* — Hoan Tran
(74) *Attorney, Agent, or Firm* — Fitzpatrick, Cella, Harper & Scinto (57) ABSTRACT

An alternating current generation circuit has a transformer and generates an alternating current voltage in accordance with a pulse signal input to the transformer. A clamp circuit has a constant-voltage element and a current limit element connected in series between the transformer, an output end of the alternating current voltage, and a ground. A direct current generation circuit generates a direct current voltage in accordance with a duty cycle of the input pulse signal. The direct current generation circuit converts, into a direct current voltage, a current that flows from the clamp circuit via the ground, and superimposes the direct current voltage on the alternating current voltage, and a voltage obtained by superimposing the direct current voltage on the alternating current voltage is output from the output end.

11 Claims, 11 Drawing Sheets

POWER SUPPLY APPARATUS FOR SUPERIMPOSING DIRECT CURRENT VOLTAGE ON ALTERNATING CURRENT VOLTAGE AND OUTPUTTING RESULTING VOLTAGE

BACKGROUND OF THE INVENTION

1. Field of the Invention

The present invention relates to a power supply apparatus for superimposing a direct current voltage on an alternating current voltage and outputting a resulting voltage, and an image forming apparatus provided with the same.

2. Description of the Related Art

As described in Japanese Patent Laid-Open No. 2004-37642, an electrophotographic developing apparatus applies a developing voltage generated by superimposing a direct current voltage on an alternating current voltage to a developing roller, so that toner efficiently adheres to an electrostatic latent image on a photosensitive member. The toner performs reciprocal motion between the photosensitive member and the developing roller due to the alternating current voltage. Accordingly, the toner adheres to the electrostatic latent image, and toner adhered to the other portions is drawn back to the developing roller. The direct current voltage controls the amount of the toner that flies to the photosensitive member, so as to adjust the density of the image.

Incidentally, when the atmospheric temperature or humidity of an image forming apparatus changes, a photosensitive member deteriorates or the like, image density fluctuates. Therefore, it is necessary to adjust a direct current voltage that constitutes a developing potential and control the image density to be a desired density. In order to widen the adjustment range of the image density, the adjustment range of the direct current voltage must be widened.

SUMMARY OF THE INVENTION

The present invention provides a power supply apparatus that enables a wide adjustment range of a direct current voltage.

According to the present invention, a power supply apparatus that outputs a voltage obtained by superimposing a direct current voltage on an alternating current voltage may comprise the following elements. An alternating current generation circuit has a transformer and is configured to generate an alternating current voltage in accordance with a pulse signal input to the transformer. A clamp circuit has a constant-voltage element and a current limit element connected in series between the transformer, an output end of the alternating current voltage, and a ground. A direct current generation circuit is configured to generate a direct current voltage in accordance with a duty cycle of the input pulse signal. The direct current generation circuit converts, into a direct current voltage, a current that flows from the clamp circuit via the ground, and superimposes the direct current voltage on the alternating current voltage, and a voltage obtained by superimposing the direct current voltage on the alternating current voltage is output from the output end.

Further features of the present invention will become apparent from the following description of exemplary embodiments (with reference to the attached drawings).

DESCRIPTION OF THE EMBODIMENTS

Several embodiments to which the technical idea of the present invention is applied will be described below with reference to drawings.

First Embodiment

Figure 1:
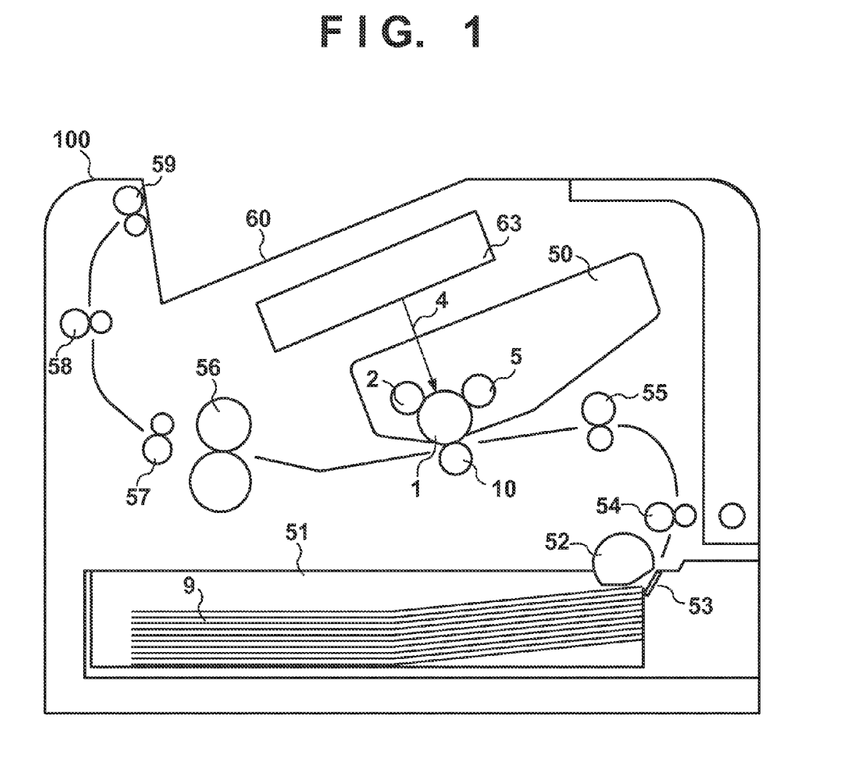
FIG. 1 is a cross-sectional diagram of an image forming apparatus.

FIG. 1 is a cross-sectional diagram of an image forming apparatus 100. A photosensitive member 1 is an image carrier that is rotatably provided on a process cartridge 50, and carries an electrostatic latent image and a toner image. A charging roller 2 is one example of a charging unit for charging the image carrier, and functions as a charging apparatus for uniformly charging the surface of the photosensitive member 1, for example. A laser scanner unit 63 is one example of an exposure unit for exposing the image carrier uniformly charged by the charging unit so as to form an electrostatic latent image, and functions as an exposure apparatus for irradiating the photosensitive member 1 with a laser beam 4 in accordance with the image data so as to form an electrostatic latent image. A developing roller 5 is one example of a developing unit for developing the electrostatic latent image on the image carrier using toner and forming a toner image, and functions as a developing apparatus for developing the electrostatic latent image into the toner image by causing the toner to fly to the photosensitive member 1. A feeding cassette 51 is loaded with sheets as recording media 9. As the sheets, various types of sheets such as plain paper, thin paper, thick paper, OHT sheets, and rough paper can be used. The recording medium 9 is fed by a feeding roller 52 and separated by a friction force of a separation pad 53 so that only one sheet of the recording medium 9 is fed to a pair of conveyance rollers 54. Subsequently, the recording medium 9 passes through the pair of conveyance rollers 54 and a pair of resist rollers 55, and is conveyed to a transfer position where the photosensitive member 1 and a transfer roller 10 contact each other. At the transfer position, the transfer roller 10 to which a predetermined transfer voltage is applied transfers the toner image on the photosensitive member 1 to the recording medium 9. A pair of fixing rollers 56 applies heat and pressure to the toner image so as to melt the toner, and fixes the image to the recording medium 9. The recording medium 9 conveyed by the pair of fixing rollers 56 passes through pairs of discharge rollers 57, 58, and 59, and is discharged to and stacked on a discharge tray 60. Note that the image forming apparatus 100 may adopt an intermediate transfer body, and may be an image forming apparatus that forms a multi-color image. Because a developing apparatus is used in either case, the present invention is applicable.

Figure 2:
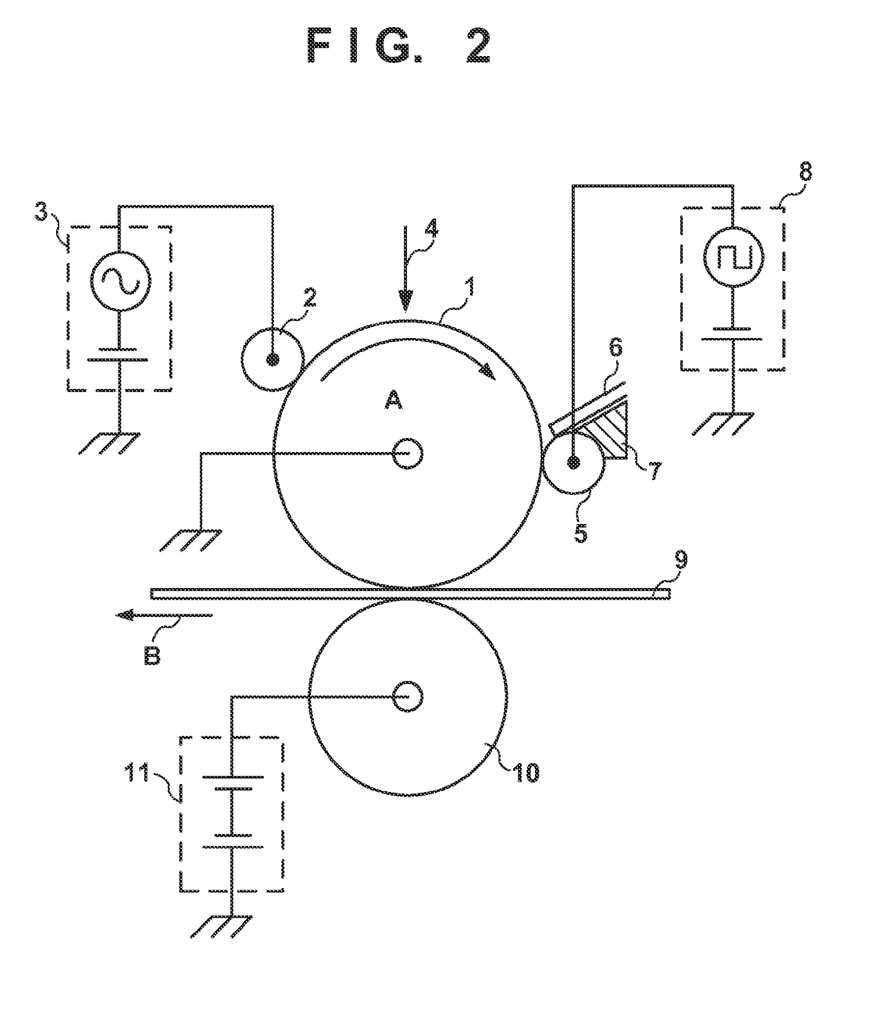
FIG. 2 is a diagram for describing an image forming process.

FIG. 2 is a diagram showing an outline of a power supply apparatus involved in the image forming process. With reference to FIG. 2, a charging power supply 3 applies a charge voltage obtained by superimposing a direct current voltage on an alternating current voltage to the charging roller 2. The surface of the photosensitive member 1 is charged by the charging roller 2 so as to achieve a predetermined direct current voltage. The charging power supply 3 is used for superimposing the alternating current voltage so that the surface potential of the photosensitive member 1 is uniformized. The charge on the surface of the photosensitive member 1 decreases when irradiated with the laser beam 4, and an electrostatic latent image in accordance with the image signal is formed. Toner 7 charged to a negative potential is accumulated between the developing roller 5 and a developing blade 6. The adhesion quantity of toner 7 adhered to the developing roller 5 is uniformized by the developing blade 6, and transported to a gap portion between the developing roller 5 and the photosensitive member 1. During image forming, a development power supply 8 applies, to the developing roller 5, a developing voltage obtained by superimposing a direct current voltage on an alternating current voltage. Due to the application of this developing voltage, an electric field is generated in the gap portion between the photosensitive member 1 and the developing roller 5, and the toner 7 adhered to the surface of the developing roller 5 flies from the developing roller 5 to the photosensitive member 1. Here, a portion on the surface of the photosensitive member 1 which is not irradiated with the laser beam 4 (non-exposure region) is charged to a negative potential, and the surface potential VD thereof is set to be lower than a direct current voltage Vdc of the development power supply 8. Therefore, in the non-exposure region, a force acts on the toner 7 in a direction forcing the toner 7 back to the developing roller 5, and the toner 7 does not fly to the non-exposure region of the surface of the photosensitive member 1. On the other hand, in a portion on the surface of the photosensitive member 1 which is irradiated with the laser beam 4 (exposure region), a negative charge on the surface is decreased. The potential VL of the exposure region will be larger than the direct current voltage Vdc of the development power supply 8. Therefore, a force attracting the toner 7 to the photosensitive member 1 is applied in the exposure region, and the toner 7 flies to the exposure region of the photosensitive member 1. The purpose of the alternating current voltage of the development power supply 8 is to improve a developing effect. Due to the alternating current voltage, the toner 7 performs a reciprocal motion in the gap portion between the photosensitive member 1 and the developing roller 5. The positive side of the alternating current voltage acts so as to draw the toner 7 back to the developing roller 5, and the negative side of the alternating current voltage acts so as to cause the toner 7 to fly to the photosensitive member 1. As such, a toner image in accordance with an electrostatic latent image formed by the laser beam 4 is formed on the surface of the photosensitive member 1. It is possible to control image density by varying the direct current voltage Vdc of the development power supply 8 and increasing or decreasing the amount of toner that flies to the photosensitive member 1. The recording medium 9 is conveyed in the direction of an arrow B. During image forming, a positive direct current voltage is applied from a transfer power supply 11 to the transfer roller 10. The toner image formed on the surface of the photosensitive member 1 and having a negative potential is transferred to the recording medium 9 due to the positive direct current voltage being applied to the transfer roller 10.

Figure 3:
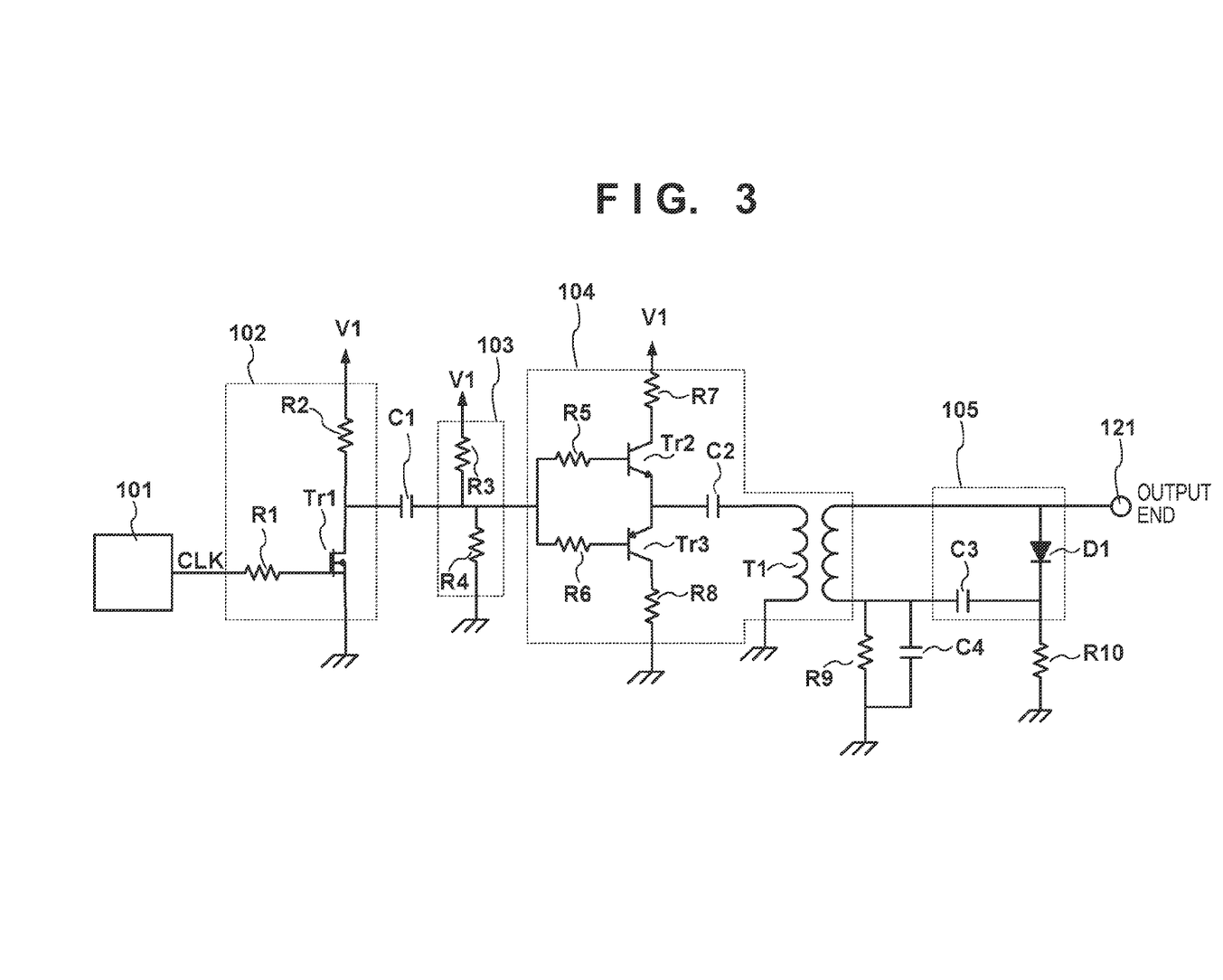
FIG. 3 is a circuit diagram showing an example of a development power supply.

FIG. 3 is a circuit diagram showing one example of the development power supply 8. A CPU 101 is a control unit that controls output and stopping of a pulse signal CLK. An amplification circuit 102 is constituted by resistors R1 and R2 and an electric field effect transistor Tr1, and amplifies the amplitude of the pulse signal CLK output from the CPU 101 to a power supply voltage V1. A capacitor C1 is a coupling capacitor that cuts a direct current component and generates an alternating current voltage that uses, as an intermediate voltage, a voltage obtained by dividing the power supply voltage V1 with a voltage dividing circuit 103. The voltage dividing circuit 103 is constituted by resistors R3 and R4. An alternating current generation circuit 104 is one example of an alternating current generation circuit that generates an alternating current voltage in accordance with an input pulse signal. The alternating current generation circuit 104 is constituted by resistors R5, R6, R7, and R8, transistors Tr2 and Tr3, and a capacitor C2, generates an alternating current voltage, and inputs the voltage to a primary side of a transformer T1. The transformer T1 boosts the alternating current voltage input on the primary side, and generates and outputs an alternating current voltage on the secondary side thereof. The alternating current voltage output from the transformer T1 is rectified and smoothed by a rectifying/smoothing circuit 105. The rectifying/smoothing circuit 105 is constituted by a rectifying diode D1 and a capacitor 3. A rectified voltage output by the rectifying/smoothing circuit 105 is divided with resistors R10 and R9. As a result, a voltage (developing voltage) obtained by superimposing a direct current voltage Vdc generated in the resistor R9 on the alternating current voltage output from the transformer T1 is output to an output end 121. A capacitor C4 is a capacitor for stabilizing the direct current voltage Vdc. When the CPU 101 changes a duty cycle of the pulse signal CLK, the rectified voltage changes, and accordingly the direct current voltage Vdc generated in the resistor R9 changes. Thereby, the CPU 101 controls the direct current component of the developing voltage.

A voltage applied to the resistor R9 in FIG. 3 corresponds to the direct current voltage Vdc. Moreover, a voltage applied to the resistor R10 corresponds to a peak voltage Vmin of the convex waveform of the alternating current voltage of the output end 121. That is, Vmin is one example of a maximum amplitude of a first polarity that acts so as to draw back toner, and is a positive maximum amplitude here. Vdc, Vmin and Vmax are respectively expressed by equations:

$$\mathrm{Vdc} = -\mathrm{V}pp \times D \times \frac{r9}{r9+r10}, \tag{1}$$

$$\mathrm{Vmin} = \mathrm{V}pp \times D \times \frac{r10}{r9+r10}, \tag{2}$$

and $$\mathrm{Vmax} = \mathrm{Vmin} - \mathrm{V}pp = \mathrm{V}pp \times \left( D \times \frac{r10}{r9+r10} - 1 \right), \tag{3}$$

where r9 is a resistance value of the resistor R9, and r10 is a resistance value of the resistor R10. Vpp is a peak-to-peak value of the alternating current voltage in the output end 121. Vmax is one example of a maximum amplitude of a second polarity that acts so as to cause the toner to fly, and is a peak voltage of the concave waveform (negative maximum amplitude) here. D is a length (duty cycle) of a section where the concave waveform is output.

As seen from the equations (1), (2), and (3), in the case where the peak-to-peak voltage Vpp is fixed while the duty cycle D is increased, the direct current voltage Vdc decreases. On the other hand, Vmin and Vmax increase.

Figure 4:
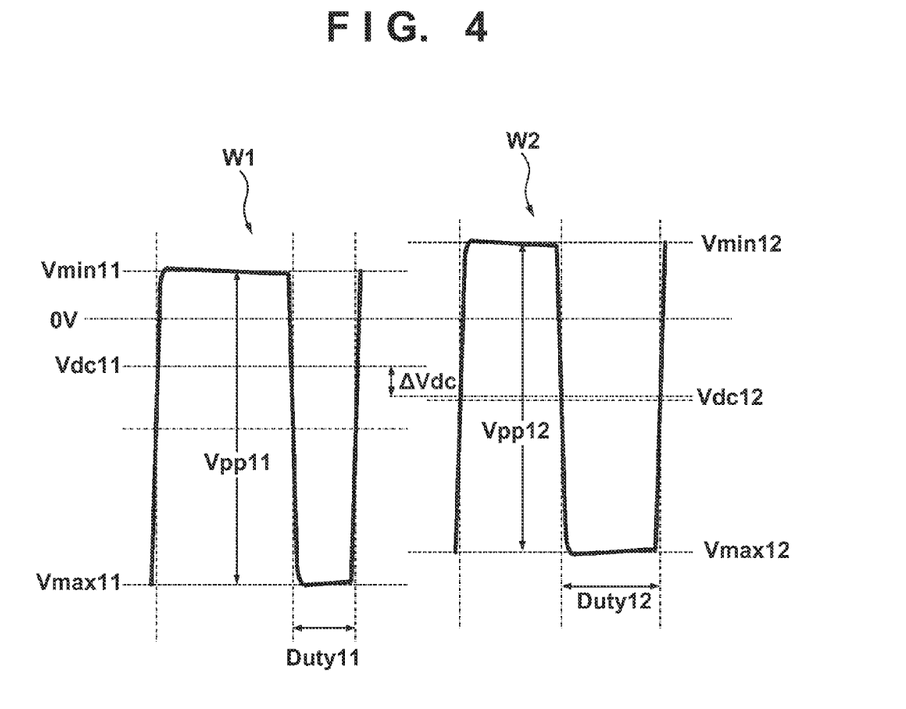
FIG. 4 is a diagram showing an example of a voltage waveform of a development power supply.

FIG. 4 is a diagram showing one example of a voltage waveform that appears in the output end 121 of the development power supply 8. Here, the peak-to-peak voltage Vpp is fixed while the duty cycle D is changed. A waveform W1 is a waveform when a duty cycle of a section where the concave waveform is output is designated as Duty11. Vmin11 is a peak voltage of the convex waveform. Vmax11 is a peak voltage of the concave waveform. Vdc11 is a direct current voltage. Vpp11 is a peak-to-peak voltage. A waveform W2 is a waveform in the case where the duty cycle is widened to Duty12. Vmin12 is a peak voltage of the convex waveform. Vmax12 is a peak voltage of the concave waveform. Vdc12 is a direct current voltage. Vpp12 is a peak-to-peak voltage. If Vpp11=Vpp12 and Duty11<Duty12, then Vdc11>Vdc12, Vmin11<Vmin12, and Vmax11<Vmax12.

As such, in the development power supply 8 shown in FIG. 3, the direct current voltage Vdc can be changed by changing the duty cycle D. As indicated by the equation (1), the direct current voltage Vdc is a value obtained by dividing the value of Vpp*D by the resistors R9 and R10. This means that a range $\Delta Vdc$ over which the direct current voltage Vdc can be varied is restricted by the resistors R9 and R10. Note that unless a sufficient range $\Delta Vdc$ over which the direct current voltage Vdc can be varied is acquired, a range over which image density obtained using the image forming apparatus 100 can be varied is narrowed and an image with a good gradation will not be acquired. Therefore, it is required that the range $\Delta Vdc$ over which the direct current voltage Vdc can be varied is widen.

Figure 5:
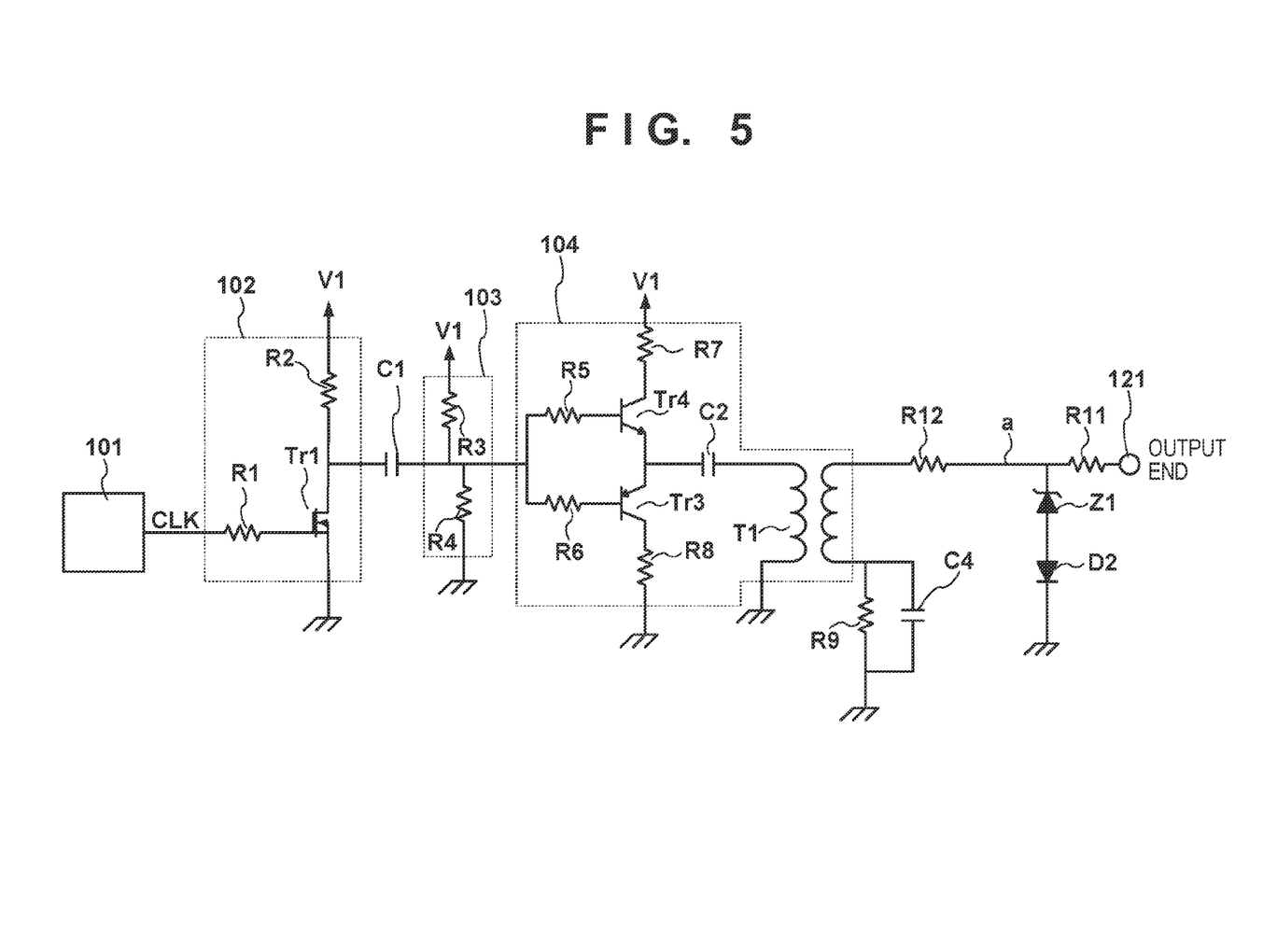
FIG. 5 is a circuit diagram showing an example of a development power supply.

FIG. 5 is a circuit diagram of the development power supply 8 in a first embodiment. Note that in FIG. 5, the same reference signs are assigned to the same circuit elements as those of the development power supply 8 shown in FIG. 3 so as to simplify description. As seen from a comparison of FIG. 3 and FIG. 5, a circuit configuration downstream of the transformer T1 is changed in FIG. 5. In particular, a Zener diode Z1 is added as one example of a clamp circuit for clamping a maximum amplitude of a first polarity that acts so as to draw back toner.

One terminal of the secondary-side terminals of the transformer T1 is connected to one end of a resistor R12. The other end of the resistor R12 is connected to one end of a resistor R11 and the cathode of the Zener diode Z1. The other end of the resistor R11 is connected to the output end 121. The anode of the Zener diode Z1 is connected to the anode of a diode D2. The cathode of the diode D2 is grounded. The other terminal of the secondary-side terminals of the transformer T1 is connected to one end of the resistor R9 that functions as a direct current generation circuit and one end of the capacitor C4. The other end of the resistor R9 and the other end of the capacitor C4 are both grounded.

The Zener diode Z1 is a constant-voltage element, and functions as a clamp circuit for clamping the peak voltage Vmin of the convex waveform of the alternating current voltages output from the transformer T1. In the section where the voltage of the concave waveform is output, the diode D2 functions as a current limit element for preventing a current from flowing from the ground (GND) in an opposite direction. A current that flows to GND through the Zener diode Z1 and the diode D2, flows to the resistor R9, and, as a result, the capacitor C4 is charged, and the voltages of both ends of the capacitor C4 will be voltages proportional to the direct current voltage Vdc. The resistor R12 functions as a shaping circuit for shaping an alternating current waveform. The resistor R11 is a protective resistor for protecting the output end 121.

The direct current voltage Vdc, the peak voltage Vmin of the convex waveform, and the peak voltage Vmax of the concave waveform at a position "a" in the drawing are respectively expressed by equations:

$$Vdc = Vz - Vpp \times D1 \quad (4),$$

$$Vmin = Vz \quad (5), \text{ and}$$

$$Vmax = Vz - Vpp \quad (6)$$

where Vz is a Zener voltage of the Zener diode Z1. Vf is a forward direction voltage of the diode D2. Vpp is the peak-to-peak value of the alternating current voltage at the position "a" in the figure. D1 is a duty cycle of the section where the concave waveform is output. Because Vz is 300 V or the like, Vf is sufficiently small compared with Vz. Therefore, Vf is disregarded in the equations (4), (5), and (6).

The resistance value of the protective resistor R11 is sufficiently small compared with the impedance of a load connected to the output end 121. Therefore, because voltage drop in the protective resistor R11 is sufficiently small, Vdc, Vmin, and Vmax can be regarded as the voltages of the output end 121.

Figure 6:
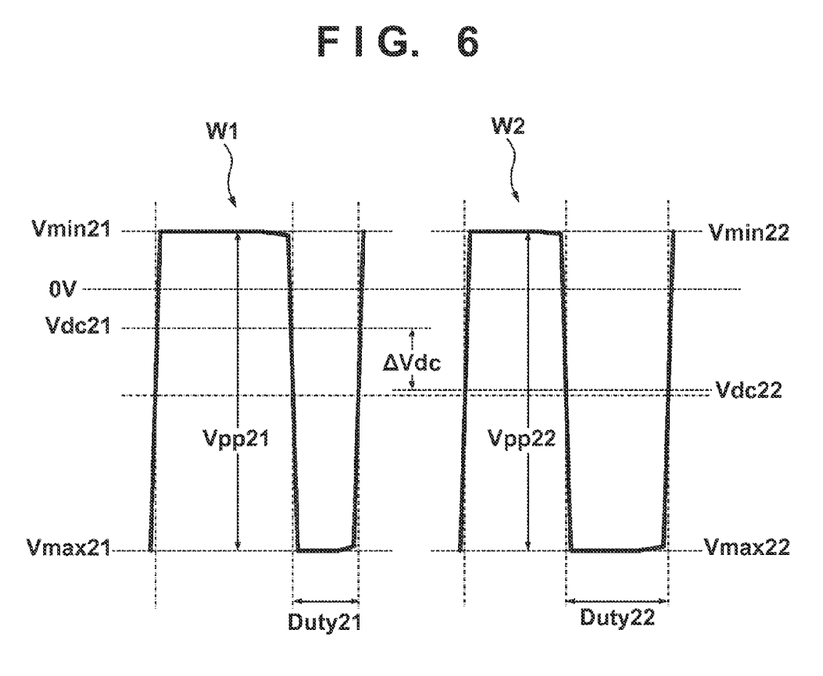
FIG. 6 is a diagram showing an example of a voltage waveform of a development power supply.

FIG. 6 shows one example of each of the waveforms W1 and W2 of the voltages that appear in the output end 121. As described above, the waveforms W1 and W2 are waveforms when the peak-to-peak voltage is fixed while the duty cycle is changed. The waveform W1 is a waveform when the duty cycle of the section where the concave waveform is output is designated as Duty21. Vmin21 is a peak voltage of the convex waveform. Vmax21 is a peak voltage of the concave waveform. Vdc21 is a direct current voltage. Vpp21 is a peak-to-peak voltage. The waveform W2 is a waveform in the case where the duty cycle is widened to Duty22. Vmin22 is a peak voltage of the convex waveform. Vmax22 is a peak voltage of the concave waveform. Vdc22 is a direct current voltage. Vpp22 is a peak-to-peak voltage.

Here, Vpp21=Vpp22, and Duty21<Duty22. Even if the duty cycle is changed, Vmin and Vmax are fixed. That is, Vmin21=Vmin22, and Vmax21=Vmax22. Comparing the equations (1) and (4), it is seen in the equation (1) that the term (r9/(R9+r10)) that produces a smaller value than 1 is a multiplication coefficient. That is, the variable range $\Delta Vdc$ is wider for Vdc of the equation (4) than for Vdc of the equation (1).

By adopting the above-described configuration, a power supply apparatus that enables the wide range $\Delta Vdc$ and an image forming apparatus provided with the same can be provided using a simple configuration.

Second Embodiment

From the viewpoint of resource saving, it is sought to reduce toner consumption. It is possible to cause even toner adhered to the developing roller 5 due to a strong image force to fly to the photosensitive member 1 by decreasing the peak voltage Vmax (by increasing the absolute value of Vmax). Thereby, it is possible to form an image with a small amount of toner when printing a line pattern or the like, for example. Moreover, it will be possible to precisely reproduce a thin line.

However, because leakage occurs on the developing roller 5 if Vmax is too low, it is not possible to decrease Vmax to be at or below a certain value. Accordingly, it is necessary to control Vmax so as to prevent leakage and to be as low a voltage as possible in order to reduce toner consumption. Thus, high precision is sought for Vmax. A power supply circuit in which changing the duty cycle also changes Vmax does not enable Vmax to be output precisely, making it difficult to reduce toner consumption. In view of this, in the present embodiment, Vmax is precisely controlled to make it possible to reduce toner consumption, even with the power supply circuit in which changing the duty cycle also changes Vmax.

Figure 7:
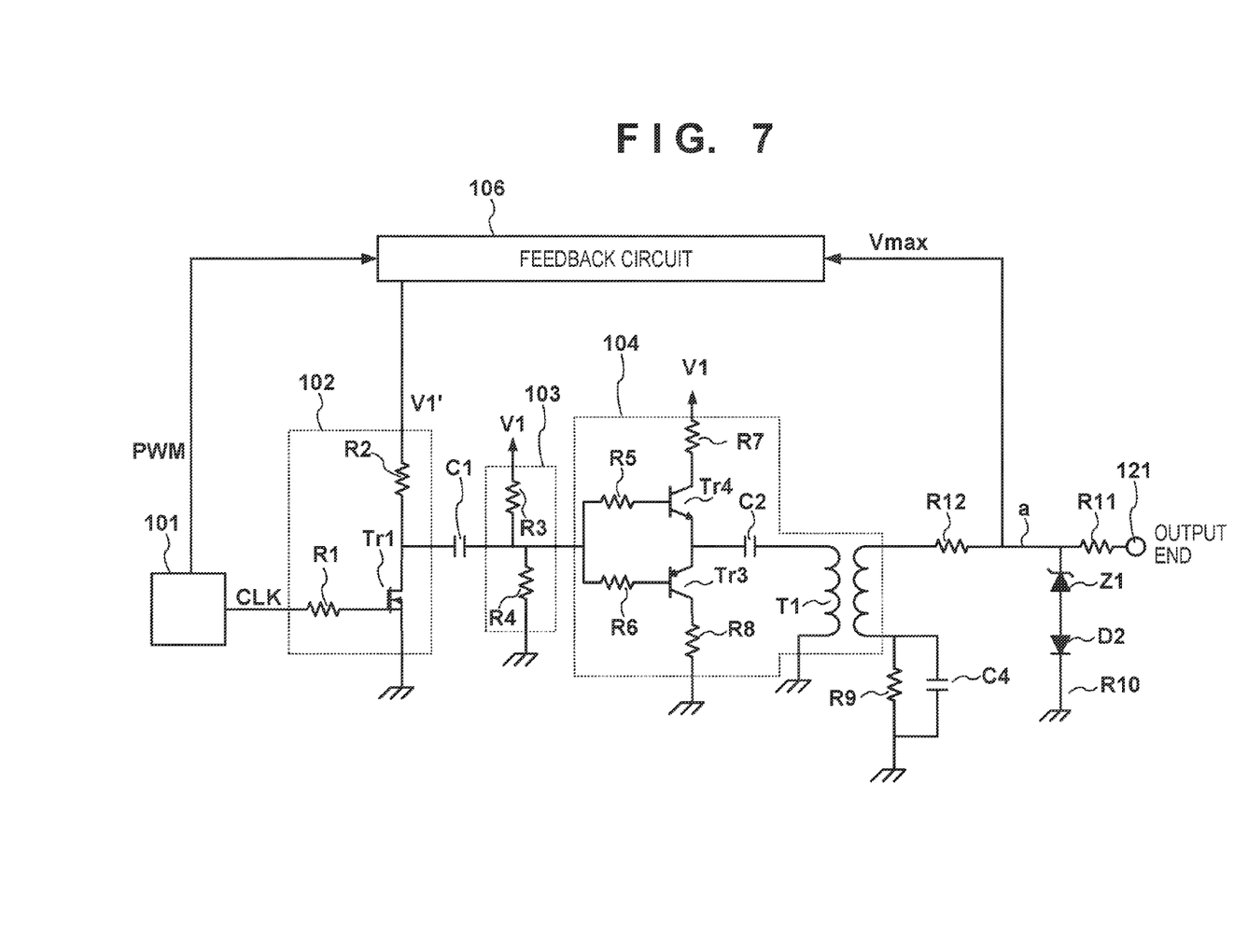
FIG. 7 is a circuit diagram showing an example of a development power supply.

FIG. 7 is a circuit diagram of the development power supply 8 in a second embodiment. Note that in FIG. 7, the same reference signs are assigned to the same circuit elements as those of the development power supply 8 shown in FIG. 5 so as to simplify description. As seen from a comparison of FIG. 5 and FIG. 7, a feedback circuit 106 is added to FIG. 8. The feedback circuit 106 performs feedback control for fixing the peak voltage Vmax of the bottom of a waveform to be a constant voltage. The feedback circuit 106 adjusts a power supply (reference voltage) V1' of the amplification circuit 102 so that the peak voltage Vmax matches a target value specified in accordance with a pulse signal output from the CPU 101.

Figure 8:
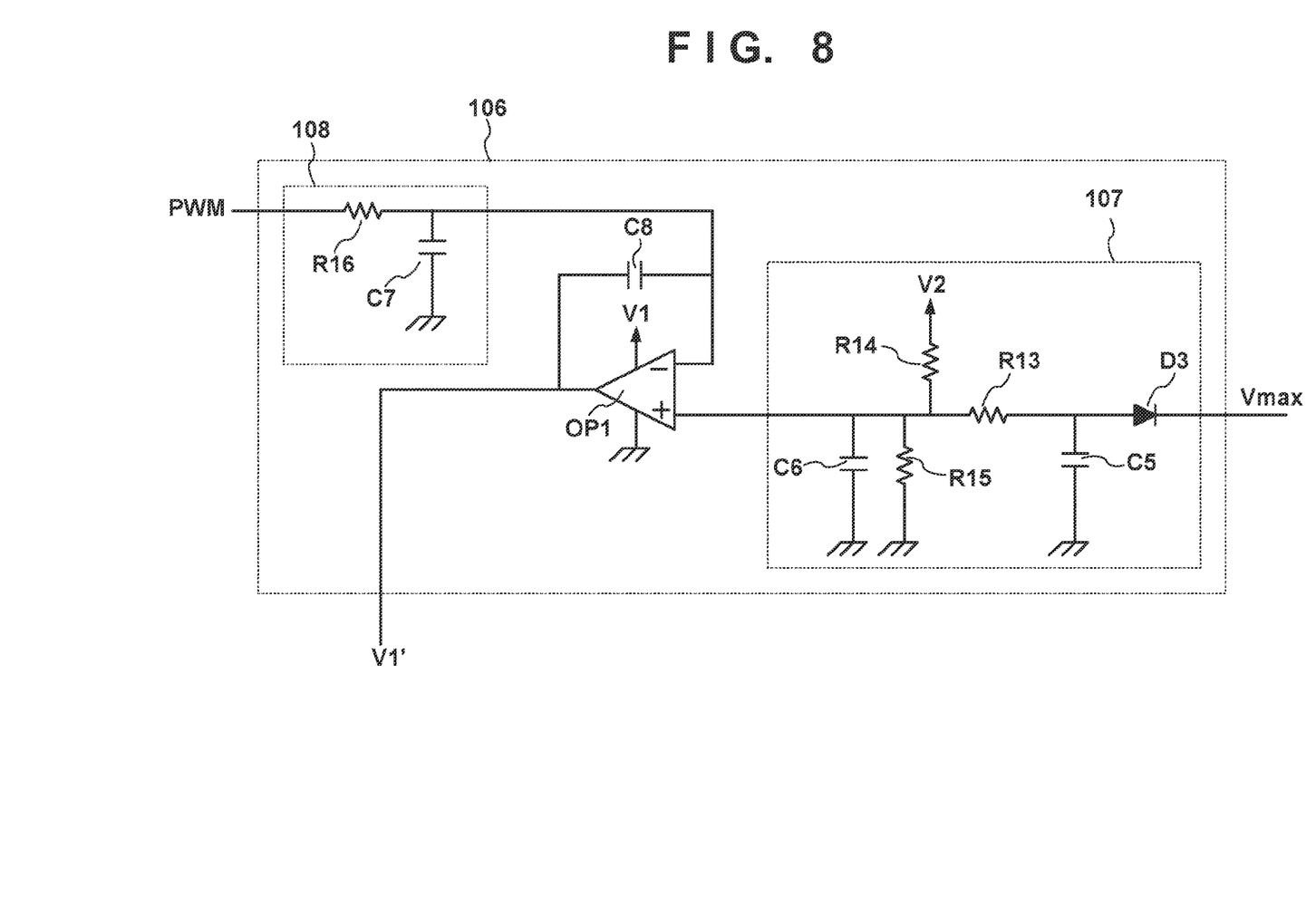
FIG. 8 is a circuit diagram showing an example of a feedback circuit.

FIG. 8 is a circuit diagram showing one example of the feedback circuit 106. A voltage detection circuit 107 is a circuit for detecting the peak voltage Vmax. The voltage detection circuit 107 is constituted by a diode D3, capacitors C5 and C6, and resistors R13, R14, and R15, for example. The peak voltage Vmax is rectified and smoothed by a rectifying/smoothing circuit constituted by the diode D3 and the capacitor C5. The peak voltage Vmax is divided with the resistors R13, R14, and R15, and input to a non-inverted input terminal (+) of an operational amplifier OP1. V2 is a power supply voltage used for operating the voltage detection circuit 107. A direct current voltage Vt obtained by smoothing a pulse signal PWM output from the CPU 101 using a resistor R16 and a capacitor C7 is input to a non-inverted input terminal (−) of the operational amplifier OP1. The CPU 101 changes the direct current voltage Vt that is input to the inverted input terminal of the operational amplifier OP1 by changing the duty cycle of the pulse signal PWM. A capacitor C8 is a capacitor for stabilizing the output voltage V1' of the operational amplifier OP1. The operational amplifier OP1 controls the output voltage V1' so that the voltages of the inverted input terminal and the non-inverted input terminal are the same. That is, the feedback circuit 106 performs feedback control such that the peak voltage Vmax matches a target voltage Vt. The CPU 101 changes the target voltage Vt by changing the duty cycle of the pulse signal PWM, and adjusts the peak voltage Vmax. As for the development power supply 8 shown in FIGS. 7 to 8, the voltage waveform of the output end 121 is the same as the voltage waveform shown in FIG. 6.

According to the present embodiment, the feedback circuit 106 makes it possible to precisely control Vmax. Therefore, for example, it is possible to control Vmax so as to prevent leakage on the developing roller 5 and to be as low a voltage as possible. Thereby, toner consumption will be likely to be reduced.

Third Embodiment

In the development power supply 8 shown in FIG. 3, the direct current voltage Vdc changes depending on variation in the resistance values of the resistors R9 and R10 and variation in the power supply voltage V1 and the transformer T1. As a result, there is a possibility that the development power supply 8 cannot output the direct current voltage Vdc precisely and the precision of image density control also deteriorates. In view of this, in the present embodiment, a circuit configuration for improving the precision of the direct current voltage Vdc is proposed.

Figure 9:
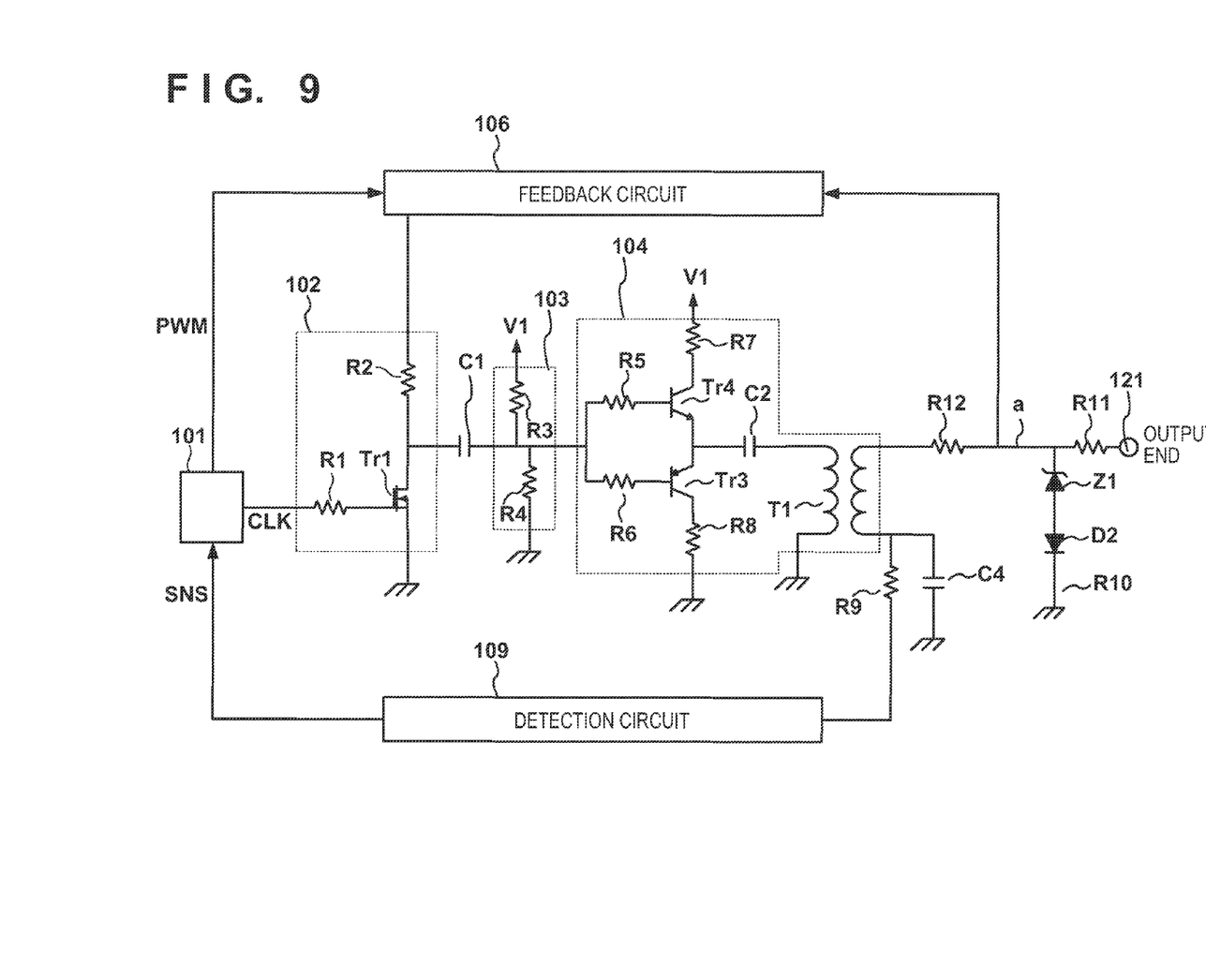
FIG. 9 is circuit diagram showing an example of a development power supply.

FIG. 9 is a circuit diagram of the development power supply 8 in the third embodiment. Note that in FIG. 9, the same reference signs are assigned to the same circuit elements as those of the development power supply 8 shown in FIG. 7 so as to simplify description. As seen from a comparison of FIG. 9 and FIG. 7, a detection circuit 109 for detecting and adjusting the direct current voltage Vdc is added.

Figure 10:
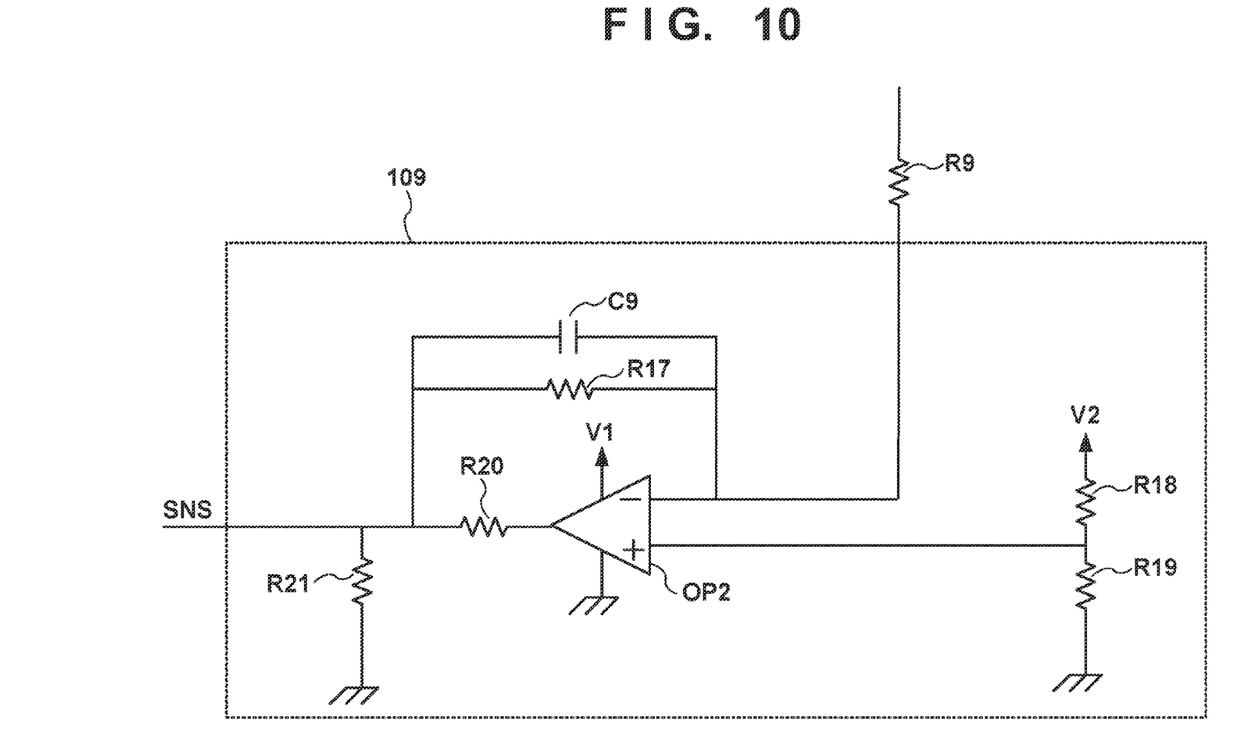
FIG. 10 is diagram showing an example of a detection circuit for detecting a direct current voltage.

FIG. 10 is a circuit diagram showing an example of the circuit configuration of the detection circuit 109. A voltage Vref obtained by dividing the power supply voltage V2 with a voltage dividing circuit constituted by resistors R18 and R19 is input to the non-inverted input terminal of an operational amplifier OP2. The resistor R9 and a resistor R17 are connected to the inverted input terminal of the operational amplifier OP2. Therefore, a voltage of a detection signal SNS output by the operational amplifier OP2 will be a voltage proportional to the direct current voltage Vdc of the transformer T1. The voltage Vsns of the detection signal SNS is expressed by an equation:

$$V_{sns} \frac{V_{ref} - V_{dc}}{r9} \times r17 - V_{ref}, \quad (7)$$

where r17 is a resistance value of the resistor R17. A capacitor C9 is a capacitor for stabilizing the output voltage of the operational amplifier OP2. Resistors R20 and R21 constitute a voltage dividing circuit for dividing the output voltage of the operational amplifier OP2. This voltage dividing circuit functions as a protection circuit for preventing an excessive voltage from being applied to the CPU 101. The detection signal SNS is input to an A/D conversion port of the CPU 101.

As indicated by the equation (7), the direct current voltage Vdc, which serves as a target, can be calculated as the voltage Vsns of the detection signal SNS, which serves as a target. This value is stored in the CPU 101. Note that the CPU 101 may have a function or a table indicating the correspondence relation between the direct current voltage Vdc and the voltage Vsns stored in an internal memory. Here, the value of the detection signal SNS, which serves as a target, is designated as Vsnst. The detection operation of the detection signal SNS is performed at a previous stage to the image forming operation by the image forming apparatus 100.

Figure 11:
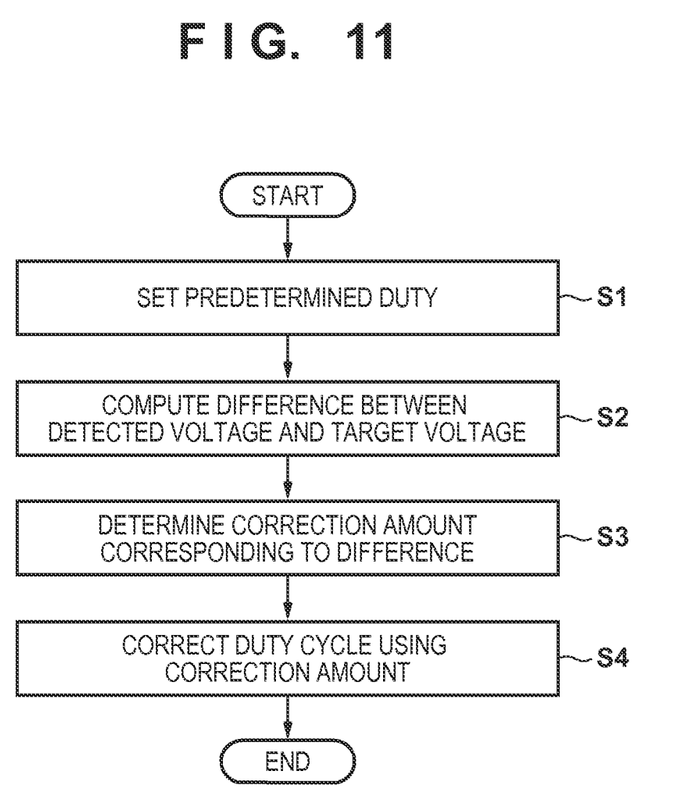
FIG. 11 is a flowchart showing processing of correcting a duty cycle.

FIG. 11 is a flowchart of the processing of correcting the duty cycle of the pulse signal CLK. In step S1, the CPU 101 sets a predetermined duty cycle for the development power supply 8, and causes the development power supply 8 to output a developing voltage. In step S2, the CPU 101 compares the voltage Vsns of the detection signal SNS with the target voltage Vsnst, and calculates a difference ΔVsns. In step S3, the CPU 101 determines a correction amount of the duty cycle from the difference ΔVsns. For example, the CPU 101 computes a duty cycle correction amount ΔD of the developing voltage corresponding to the difference ΔVsns as the correction amount. The relation between the duty cycle and the direct current voltage Vdc is the same as that indicated by the equation (4) in the first embodiment. That is, the CPU 101 computes ΔD from ΔVsns using the equation (4). In step S4, the CPU 101 corrects the duty cycle of the pulse signal CLK using the correction amount. Thereby, the development power supply 8 can output a direct current voltage Vdc that is close to the target voltage. Note that steps S1 to S3 are executed before the start of an image forming operation, and the correction processing of step S4 may be executed when the developing voltage is output in the image forming operation.

In the development power supply 8 shown in FIG. 3, the direct current voltage Vdc changes depending on variation in the resistance values of the resistors R9 and R10 and variation in the power supply voltage V1 and the transformer T1. As a result, there is a possibility that the direct current voltage Vdc is not output precisely and the precision of image density control also deteriorates. On the other hand, in the present embodiment, the direct current voltage Vdc is detected by the detection circuit 109, and the CPU 101 corrects the duty cycle of the pulse signal CLK so as to bring the direct current voltage Vdc close to the target value. Thereby, the direct current voltage Vdc is output precisely, and the precision of image density control also improves.

SUMMARY

In the above embodiments, the development power supply 8 was described as a power supply apparatus for outputting a voltage obtained by superimposing a direct current voltage on an alternating current voltage. As described with reference to FIGS. 5, 7, 9 and the like, a clamp circuit for clamping, from among a maximum amplitude of a first polarity that acts so as to draw back toner and a maximum amplitude of a second polarity that acts so as to cause toner to fly, at least the maximum amplitude of the first polarity is adopted. As described with reference to FIGS. 4 and 6, a power supply apparatus is realized which makes it possible to widen the range ΔVdc over which the direct current voltage can be varied by adopting the clamp circuit.

The clamp circuit is provided between the output end 121 and the ground GND, for example, and may have a constant-voltage element that maintains Vmin, which represents the maximum amplitude of the first polarity, to a predetermined value (e.g., Zener voltage Vz). As described with reference to FIG. 5 and the like, the constant-voltage element is a Zener diode, for example. The anode of the Zener diode Z1 is connected to ground, and the cathode of the Zener diode Z1 is connected to the output end 121. The Zener diode Z1 is relatively inexpensive and those with various Zener voltages are in the market, providing excellent availability. That is, the clamp circuit can be realized with an inexpensive circuit configuration. Note that a constant-voltage element or a circuit that is different from/not a Zener diode but has a similar function may be adopted. Note that the polarity of Vmin and Vmax may be changed in accordance with the polarity of the toner.

As described with reference to FIG. 5 and the like, a current limit element (e. g., the diode D2) connected in series to the Zener diode Z1 may be further provided. Note that the current limit element can prevent a current from flowing from ground to the Zener diode Z1 during a time period when the concave waveform of the developing voltage from among the convex waveform and the concave waveform is output. The current limit element is the diode D2, for example. As shown in FIG. 5 and the like, the anode of the diode D2 is connected to the output end 121, and the cathode of the diode D2 is connected to the ground. Thereby, the diode D2 prevents a current in the opposite direction. Note that a current limit element or a circuit that is different from the diode D2 but has a similar function may be adopted.

As described with reference to FIGS. 3, 5 and the like, the direct current generation circuit may include the capacitor C4 connected between the output end 121 and ground, and a first resistor element (e.g., the resistor R9) connected in parallel to the capacitor C4. A direct current generation circuit can be realized with such a simple circuit, but a more complicated circuit configuration may be adopted. The capacitor C4 is optional, but the direct current voltage generated by the resistor R9 is stabilized by adding the capacitor C4.

As described with reference to FIGS. 7 and 8, a control circuit for detecting Vmax, which is the maximum amplitude of the second polarity, and controlling the amplitude of an alternating current voltage so as to bring Vmax close to the target value may be adopted. As described above, Vmin is controlled to be constant by the constant-voltage element, and Vmax needs to be controlled to be constant in order to maintain the peak-to-peak voltage Vpp constant. Such a control circuit may include the feedback circuit 106 for feeding back the difference between the maximum amplitude of the second polarity and the target value to the amplitude of the pulse signal. Thereby, Vmax is controlled to be constant, and therefore the peak-to-peak voltage Vpp can be maintained constant. If it becomes possible to precisely control Vmax, toner consumption is easily reduced even with a power supply circuit in which changing the duty cycle also changes Vmax. This is because it is possible to realize a Vmax that is just within the limit at which leakage does not occur in the developing roller 5, and to form an image with a small amount of toner when printing a line pattern or the like. Note that the feedback circuit 106 may also be adopted in the development power supply 8 shown in FIG. 3.

As described with reference to FIGS. 9 and 10, an adjustment circuit for adjusting the duty cycle of the alternating current voltage by adjusting the duty cycle of the pulse signal based on the direct current voltage Vdc so as to bring the direct current voltage Vdc generated by the direct current generation circuit close to a target voltage may further be included. As described with reference to FIGS. 9 and 10, such an adjustment circuit can be realized by the detection circuit 109 and the CPU 101, for example. The detection circuit 109 may function as a detection unit for detecting the direct current voltage Vdc, and the CPU 101 may function as a determination unit for determining a duty cycle of a pulse signal corresponding to the direct current voltage Vdc detected by the detection unit, and as a generation unit for generating a pulse signal in accordance with the duty cycle. As described with reference to FIG. 11 and the like, the CPU 101 may function as a correction unit for correcting the duty cycle of the pulse signal in accordance with the difference between the direct current voltage Vdc detected by the detection unit and the target voltage. Note that the relation between the direct current voltage Vdc and the target voltage may be realized by the detection voltage Vsns and the target voltage Vsnst, as described above. Alternatively, the adjustment circuit may be adopted in the development power supply 8 shown in FIG. 3.

The development power supply 8 may function as a supply unit for supplying a developing voltage to the developing unit of the image forming apparatus 100. Moreover, as described with reference to FIG. 11, the CPU 101 functions as a density control unit for controlling the density of the toner image by adjusting the direct current voltage Vdc included in the developing voltage. According to the present embodiment, the range ΔVdc over which the direct current voltage is variable can be widened, and thus the adjustment range of the image density can also be widened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-216629, filed Oct. 23, 2014, which is hereby incorporated by reference wherein in its entirety.

What is claimed is:

1. A power supply apparatus that outputs a voltage obtained by superimposing a direct current voltage on an alternating current voltage, comprising:
   an alternating current generation circuit having a transformer and configured to generate an alternating current voltage in accordance with a pulse signal input to the transformer;
   a clamp circuit having a constant-voltage element and a current limit element connected in series between the transformer, an output end of the alternating current voltage, and a ground; and
   a direct current generation circuit configured to generate a direct current voltage in accordance with a duty cycle of the input pulse signal;
   wherein the direct current generation circuit converts, into a direct current voltage, a current that flows from the clamp circuit via the ground, and superimposes the direct current voltage on the alternating current voltage, and a voltage obtained by superimposing the direct current voltage on the alternating current voltage is output from the output end.

2. The apparatus according to claim 1, wherein in the clamp circuit, the constant-voltage element is a Zener diode, and the current limit element is a diode.

3. The apparatus according to claim 1, wherein the direct current generation circuit includes:
   a capacitor connected between an output end on a ground side of the alternating current generation circuit and the ground; and
   a first resistor element connected in parallel to the capacitor.

4. The apparatus according to claim 1, wherein the clamp circuit clamps a maximum amplitude of a first polarity of the alternating current voltage.

5. The apparatus according to claim 4, further comprising, a control circuit configured to detect a maximum amplitude of a second polarity that is opposite to the first polarity of the alternating current voltage and control an amplitude of the alternating current voltage so as to bring the maximum amplitude of the second polarity close to a target value.

6. The apparatus according to claim 5, wherein the control circuit includes a feedback circuit configured to feedback a difference between the target value and the maximum amplitude of the second polarity to the amplitude of the pulse signal.

7. The apparatus according to claim 1, further comprising:
   an adjustment circuit configured to adjust the duty cycle of the alternating current voltage by adjusting the duty cycle of the pulse signal based on the direct current voltage so as to bring the direct current voltage generated by the direct current generation circuit close to a target voltage.

8. The apparatus according to claim 7, wherein the adjustment circuit includes:
   a detection unit configured to detect the direct current voltage;
   a determination unit configured to determine the duty cycle of the pulse signal corresponding to the direct current voltage detected by the detection unit; and
   a generation unit configured to generate the pulse signal in accordance with the duty cycle.

9. The apparatus according to claim 8, wherein the determination unit includes a correction unit configured to correct the duty cycle of the pulse signal in accordance with the difference between the direct current voltage detected by the detection unit and the target voltage.

10. An image forming apparatus comprising:
    an image carrier;
    a charging unit configured to charge the image carrier;
    a latent image forming unit configured to form an electrostatic latent image by exposing the image carrier uniformly charged by the charging unit;
    a developing unit configured to develop the electrostatic latent image formed on the image carrier using toner and form a toner image; and
    a power supply configured to supply, to the developing unit, a developing voltage obtained by superimposing a direct current voltage on an alternating current voltage;
    the power supply including:
       an alternating current generation circuit having a transformer and configured to generate an alternating current voltage in accordance with a pulse signal input to the transformer;
       a clamp circuit having a constant-voltage element and a current limit element connected in series between the transformer, an output end of the alternating current voltage, and a ground; and
       a direct current generation circuit configured to generate a direct current voltage in accordance with a duty cycle of the input pulse signal;
    wherein the direct current generation circuit converts, into a direct current voltage, a current that flows from the clamp circuit via the ground, and superimposes the direct current voltage on the alternating current voltage, and a voltage obtained by superimposing the direct current voltage on the alternating current voltage is output from the output end.

11. The apparatus according to claim 10, further comprising,
    a density control unit configured to control the density of the toner image by adjusting a direct current voltage included in the developing voltage.

* * * * *